E. B. PRIDDY.
PARCEL POST SCALE.
APPLICATION FILED OCT. 22, 1914.
1,205,564.
Patented Nov. 21, 1916.
3 SHEETS—SHEET 1.
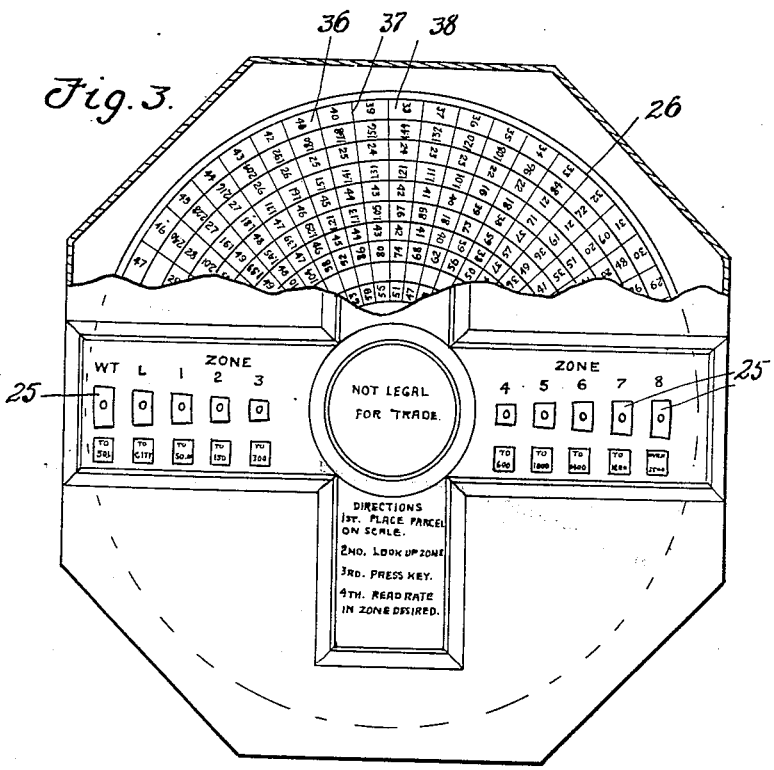

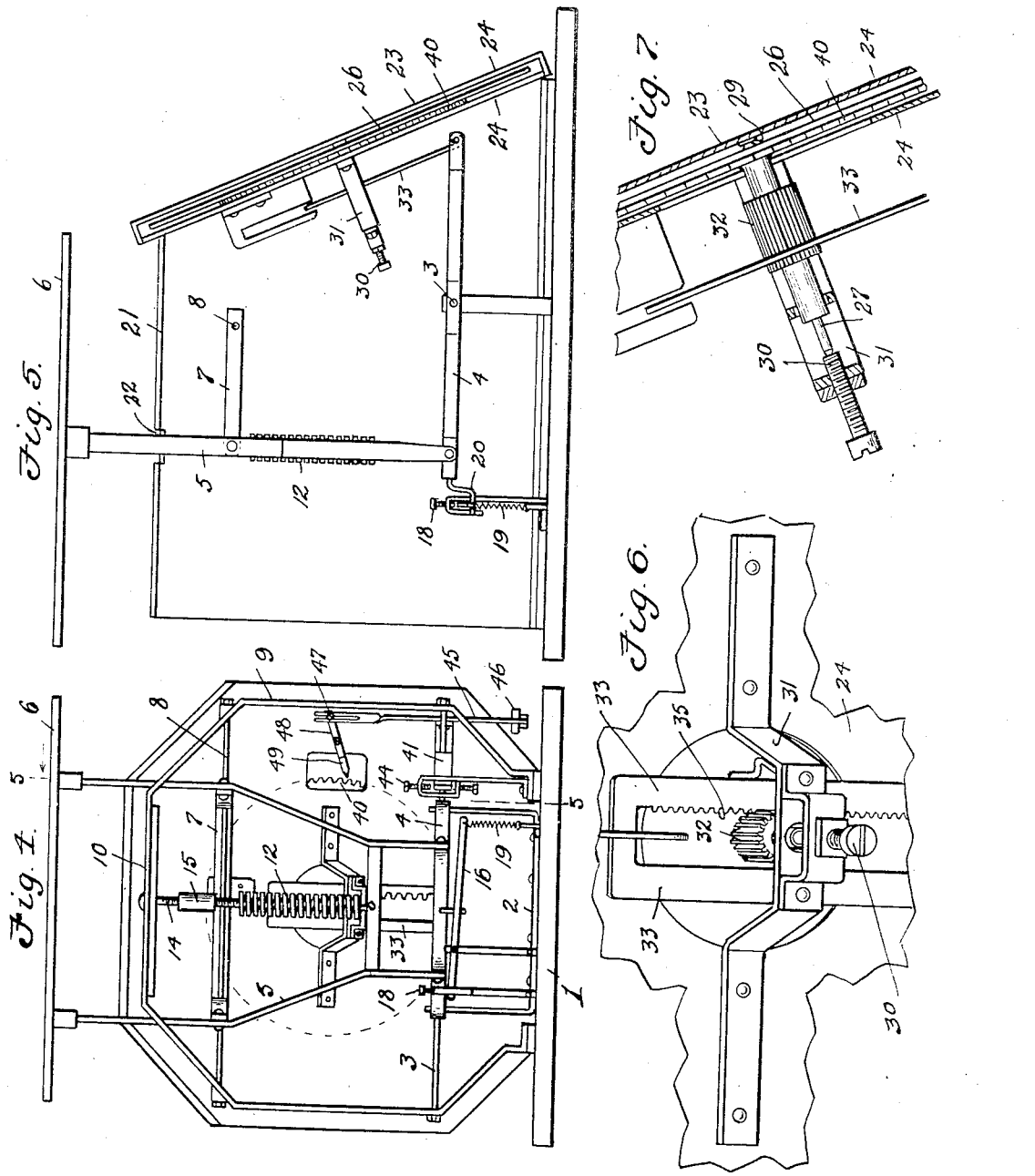

E. B. PRIDDY.
PARCEL POST SCALE.
APPLICATION FILED OCT. 22, 1914.
1,205,564.
Patented Nov. 21, 1916.
3 SHEETS—SHEET 3.
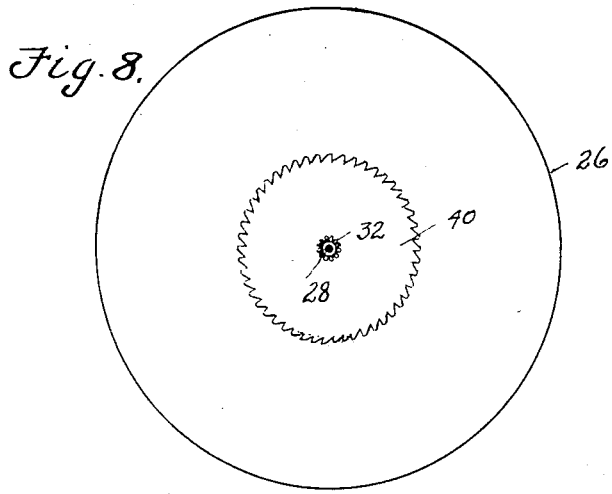
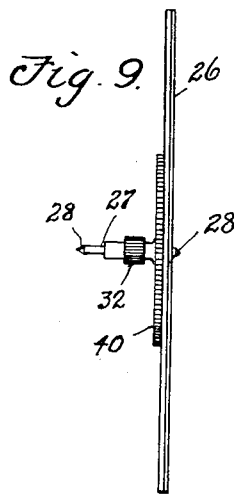
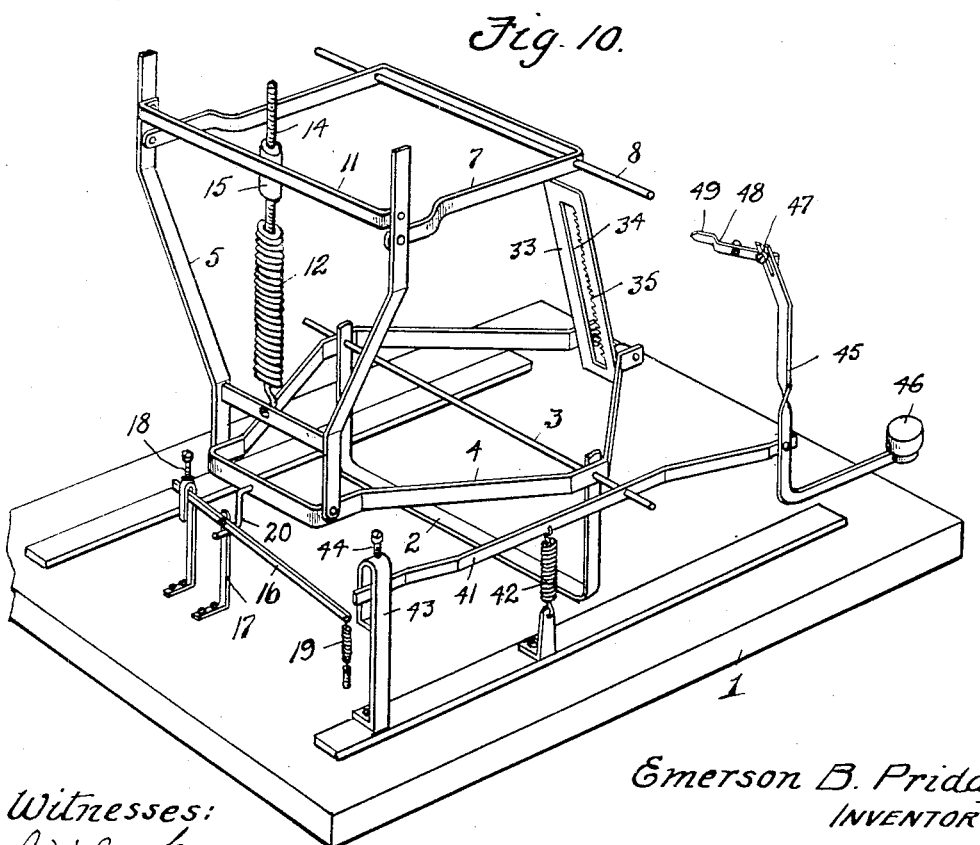
Emerson B. Priddy
INVENTOR
By George J. Oltoch
ATTORNEY
Witnesses:

UNITED STATES PATENT OFFICE.

EMERSON B. PRIDDY, OF CHICAGO, ILLINOIS, ASSIGNOR TO THE PARCEL POST SCALE CO., OF LOGANSPORT, INDIANA, A CORPORATION OF INDIANA.

PARCEL-POST SCALE.

1,205,564.

Specification of Letters Patent.

Patented Nov. 21, 1916.

Application filed October 22, 1914. Serial No. 868,063.

*To all whom it may concern:*

Be it known that I, EMERSON B. PRIDDY, a citizen of the United States, residing at Chicago, in the county of Cook and State of Illinois, have invented certain new and useful Improvements in Parcel-Post Scales, of which the following is a specification.

The invention relates to an improvement in scales of the spring type and designed particularly for use in connection with the weighing of parcel post packages, the main essential of the invention providing for such operation as will prevent any confusion in determining the proper weight of the article.

The present invention is directed particularly to the use of a rotatable dial which under weight pressure indicates through the appropriate one of a series of apertures the weight numerals, and the combination with such scale of means whereby the numeral dial may be shifted or spaced to indicate a single weight indicating numeral through the particular opening, with a view to eliminating the confusion incident to the appearance through such opening of adjacent weight numerals, with the consequent inability to tell which is the proper numeral.

The salient feature of the present invention resides therefore in what may be termed spacing means for the dial so that under weight action the dial may be shifted to eliminate all but the proper numeral, thereby insuring rapidity and absolute correctness in the weighing operation.

The invention in its essential details of construction will be described in the following specification, reference being had particularly to the accompanying drawings, in which:

Figure 1 is a side elevation of the improved scale. Fig. 2 is a front elevation of the same. Fig. 3 is an enlarged broken elevation of the casing with the dial therein. Fig. 4 is a rear elevation with the rear wall of the casing removed. Fig. 5 is a section on line 5—5 of Fig. 4. Fig. 6 is a broken perspective showing the dial connection and operating means. Fig. 7 is a vertical sectional view of the same. Fig. 8 is a rear elevation of the dial. Fig. 9 is an edge view of the same. Fig. 10 is a perspective view of the operative parts, with the dial and casing removed.

The present scale is designed particularly for parcel post use and is constructed with a view for the rapid weighing of parcel post packages wherein the rate for any zone as well as the weight of the particular parcel will be indicated.

The present scale is designed for use as a spring scale and that portion directed particularly to the supporting and spring structure may be briefly described as follows, it being understood that the structure is largely conventional and designed merely with a view to accomplishing the desired function.

The scale structure comprises a base 1 on which is supported a fulcrum frame 2 in the uprights of which is fixed a rod 3. The rod supports a movable or platform frame including a horizontally arranged section 4 supported directly upon the rod 3 for pivotal movement and an upright frame section 5 pivotally connected to the rear portion of the section 4. The upright section directly supports a platform 6, and to said section 5 is pivotally connected a guiding frame 7 of U-shape, and which at a point remote from the frame 5 is pivotally mounted upon a rod 8. The rods 3 and 8 are supported in an appropriately arranged holding frame 9 secured to the base and having a transverse section 10 overlying the cross bar 11 of the frame 5. A spring 12 is secured at one end to a lower cross bar of the frame 5, and is connected at the upper end to an adjusting rod 14 secured at its upper end in the cross bar 10, an adjusting nut 15 being threaded upon the rod 14 for adjusting the tension of the spring 12 in the usual manner.

A simple means is provided for preventing undue vibration of the parts in the weighing operation, said means involving a lever 16 fulcrumed upon an upright 17 rising from the base and provided with an adjusting means 18 at the short end, and connected through the medium of a spring 19 with the base at the long end. An angularly arranged finger 20 projects from the frame 4, and underlies the lever 16 adjacent its pivot. A suitable casing as 21 incloses the operating parts, being provided with openings 22 for the passage of the upright portions of the frame 5, so that the platform 6 may be supported above the casing. The face wall 23 of the casing includes spaced inner and outer walls 24, connected by side and end walls to form a hollow housing.

The outer wall of the housing constitutes the face plate of the scale, and in the instance shown is provided with a longitudinal row of perforations 25 disposed on each side of the center and constituting the reading openings, being the openings through which the scale marks on the dial hereinafter referred to are visible. In the present instance, reading these openings from left to right the first opening indicates the weight, the next opening indicates the local rate of postage, while the succeeding openings indicate the different zones as classified under the parcel post regulation. Below each opening in succession are printed limit indications with respect to each opening, as for example the weight opening has indicated therebelow the limit weight of the scale, while each of the zone openings, the mileage limitations of the zone.

Rotatably mounted in the face housing is the dial 26, the same having a fixed pivot rod 27 terminating in bearing points 28 in advance and rear of the dial. The pivot point in advance seats in a suitable bearing 29 in the rear of the face plate, and the rear bearing point is supported for adjustment in a bearing rod 30 threaded through a frame 31 secured to the rear wall of the face housing, the frame strip 31 being centrally and rearwardly offset from said plate to accommodate the parts. The pivot rod 27 is provided with a toothed annular surface 32, forming in effect a pinion fixed to the pivot rod. The forward end of the frame 4 is provided with an operating member 33 formed with a longitudinal opening 34 designed to receive the pinion 32 and one edge of the opening is formed as a gear rack 35 to coöperate with the pinion and rotate the dial in the movement of the supporting frame under the weight of the article on the platform.

The face of the dial, or that surface next the face wall of the casing is formed with a series of concentric rows 36 divided by radial lines 37 to form spaces 38, in which latter are arranged appropriate data to correspond with the openings 25, it being understood that one of the openings registers with each of the concentric rows and that the openings are so formed and of such a size as to correspond with the spaces of the particular row. The indicating data on certain of the rows is reversed with respect to that on the other, as the openings are on opposite sides of the center and with any other arrangement a proper reading could not be had.

So far as described, assuming such novelty as may exist in the structure, the device provides an ordinary spring scale designed particularly for parcel post purposes. It is obvious however that a particular article may, under its weight influence on the scale, position the dial so that through the particular opening conforming to conditions, there will be visible two of the spaces 38, with a consequent confusion as to what is the proper reading. One of the salient and important features of the present invention therefore is to provide a means whereby the scale may be manually adjusted or shifted so as to position the same to present a single reading only through the opening. This will necessarily be the correct reading as the parcel post regulations do not consider fractions of pounds, and hence the maximum rating of the dual or double condition above noted is the proper rating. The invention therefore broadly contemplates a means capable of manual operation, which is constructed to a view to causing a shifting or step-up movement of the dial, and while I will hereinafter describe a simple type of such device it is to be understood that such is primarily for the purposes of illustration and is nowise intended as a limitation. In carrying out this detail of the invention I secure upon the rear surface of the dial 26 a rear disk 40 having the teeth corresponding in number to the number of spaces 38 on the face of the dial. Pivotally mounted upon the rod 3 is a lever 41, connected with the base in rear of the pivot through the medium of spring 42, and having its rear end seated in a guide 43 and adapted to receive an adjusting screw 44 whereby the movement of the lever against the influence of the spring is adjustably limited. To the forward end of the lever is secured an angle bar 45, the approximately horizontal portion of which extends through the side wall of the casing and terminates in a button or finger piece 46. The upright portion of the angle bar is adjustably connected through a screw and slot connection 47 with a limiting lever 48, pivotally supported on the face casing wall with its inner end 49 off-set and terminating in a somewhat pointed end. The parts are so positioned that the pointed end of the lever 48 will coöperate with the teeth of the gear disk 40, said teeth being slightly flattened at their outer ends. The pointed end of the lever 48 swings through an arc intersecting the radius of the dial and the disk 40 at the engaged tooth of the latter so that the dial is positively moved in a forward direction.

In operation, assuming the condition wherein the article being weighed so adjusts the dial as to indicate to the particular opening corresponding to the desired condition, two data bearing spaces 38. The button 46 is then pressed upon causing the lever 48 to engage a particular tooth, and step-up or shift the dial so that the space bearing the maximum data indication will be properly and perfectly alined with the opening. All possible confusion is thus avoided, and the scale becomes capable of extremely rapid use while embodying a certainty of result coupled with the complete elimination of any guess work as to what the proper scale indicating data may be.

As previously stated the salient feature of the invention resides in this shifting or step-up operation of the dial, and believing such function to be broadly new in weight adjusting dials it is to be particularly understood that any and all means for the accomplishment of this object, that may fall within the scope of the appended claims, are contemplated as within the spirit of the present invention, and that same may be used in connection with any appropriate weighing mechanism, whether spring controlled or otherwise.

What is claimed is:

1. In a scale, a casing provided with a sight opening, a weight influenced dial located in the casing and bearing a set of rates which are displayed progressively through said opening and which increase in value in direct proportion to the progression of the weight units, and means for positively shifting the dial forwardly independently of its movement under the influence of the weight units to present a single rate reading only through said opening, said means being movable in a direction intersecting the radius of the dial at the point of engagement of the said means.

2. In a scale, a casing provided with a sight opening, a weight influenced dial located in the casing and bearing a set of rates which are progressively displayed through said opening and which increase in value in direct proportion to the progression of the weight units, and means for positively shifting the dial forwardly independently of its movement under the influence of the weight units to present the highest only of two rate readings displayed through said opening under the weight units, said means being movable in a direction intersecting the radius of the dial at the point of engagement of the said means.

3. In a scale, a weight influenced dial bearing a set of rates arranged progressively in increasing values in direct proportion to the progression of the weight units, and means for positively shifting the dial forwardly independently of its movement under the influence of the weight units to shift the dial so as to present the rate readings to a position beyond that which the weight units have positioned same, said means being movable in a direction intersecting the radius of the dial at the point of engagement of the said means.

4. The combination with a data bearing scale dial, of means having a limited movement in the direction of the rotation of the dial for shifting said dial in one direction only to a degree controlled by the position of the data thereon.

5. A scale formed with a sight opening, a weight influenced data characteristics bearing dial arranged to present the data through said opening under the influence of weight units, and manually operable means for shifting the dial forwardly to insure registry of only one data characteristic with the opening, said means being movable in a direction intersecting the radius of the dial at the point of engagement of the said means.

6. A scale formed with a sight opening, a weight influenced data bearing dial arranged to present the data through said opening, and manually operable means for positively shifting the dial forwardly to insure registry of proper data with the opening, to the exclusion of other data, said means being movable in a direction intersecting the radius of the dial at the point of engagement of the said means.

7. The combination of a data bearing scale dial, a gear disk connected with the dial and a lever movable into an outer engagement with the teeth of the gear disk, said lever being movable through an arc intersecting the radius of the disk at the engaged tooth.

8. A data bearing scale dial including a gear disk fixed to the dial, and means for shifting the dial including a lever coöperating with said gear teeth, and adjustable means for imparting a limiting movement to said lever.

9. The combination with a data bearing scale dial, of means for imparting an independent step-up movement to said dial in the direction of the forward rotation of the same and in accordance with the data thereon, said means being movable in a direction intersecting the radius of the dial at the point of engagement of the said means.

10. The combination with a data bearing scale dial, of means for imparting an independent step-up movement to said dial in the direction of the forward rotation of the same, and in accordance with the data thereon, said means being movable in a direction intersecting the radius of the dial at the point of engagement of the said means and locking the dial against movement.

11. The combination with a scale dial bearing data successively increasing in the direction of movement of the dial under weight influence, of manually operable means movable in the direction of the forward rotation of the dial for imparting a limited independent movement to said dial in the direction of the successively increasing data, said means being movable in a direction intersecting the radius of the dial at the point of engagement of the said means.

12. The combination with a scale dial formed with spaces to receive data successively increasing in the direction of movement of the dial under weight influence, of manually operable means movable in the direction of the forward rotation of the dial for imparting to the dial a movement less than the length of one of said spaces and in the direction of the successively increasing data, said means being movable in a direction intersecting the radius of the dial at the point of engagement of the said means.

13. The combination with a data bearing weight influenced scale dial, of manually operable means having a limited movement in the direction of the forward rotation of the dial for shifting the latter to a degree controlled by the position of the data thereon, and adjusting means for controlling the degree of movement of the manually operable means.

In testimony whereof I affix my signature in presence of two witnesses.

EMERSON B. PRIDDY.

Witnesses:
L. W. COOK,
GEORGE J. OLTSCH.